US011324221B2

(12) United States Patent
Inoue

(10) Patent No.: US 11,324,221 B2
(45) Date of Patent: May 10, 2022

(54) PEST CONTROL COMPOSITION AND PEST CONTROL METHOD

(71) Applicant: Sumitomo Chemical Company, Limited, Tokyo (JP)

(72) Inventor: Takuya Inoue, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 927 days.

(21) Appl. No.: 16/074,094

(22) PCT Filed: Jan. 26, 2017

(86) PCT No.: PCT/JP2017/002672
§ 371 (c)(1),
(2) Date: Jul. 31, 2018

(87) PCT Pub. No.: WO2017/135137
PCT Pub. Date: Aug. 10, 2017

(65) Prior Publication Data

US 2021/0007357 A1 Jan. 14, 2021

(30) Foreign Application Priority Data

Feb. 1, 2016 (JP) ............................ JP2016-016909

(51) Int. Cl.
*A61K 33/24* (2019.01)
*A01N 43/82* (2006.01)
*A01N 43/56* (2006.01)
*A01N 43/90* (2006.01)
*A61K 47/36* (2006.01)

(52) U.S. Cl.
CPC ............. *A01N 43/82* (2013.01); *A01N 43/56* (2013.01); *A01N 43/90* (2013.01)

(58) Field of Classification Search
USPC .......................................................... 504/246
See application file for complete search history.

(56) References Cited

U.S. PATENT DOCUMENTS

| | | | |
|---|---|---|---|
| 4,742,074 | A | 5/1988 | Nishida et al. |
| 2009/0048311 | A1 | 2/2009 | Williams et al. |
| 2012/0114624 | A1 | 5/2012 | Lahm et al. |
| 2013/0059894 | A1 | 3/2013 | Matsuzaki |
| 2013/0096174 | A1 | 4/2013 | Matsuzaki et al. |
| 2014/0011852 | A1 | 1/2014 | Venturini et al. |

(Continued)

FOREIGN PATENT DOCUMENTS

| | | | |
|---|---|---|---|
| CL | 2008002382 | A1 | 10/2008 |
| CL | 2011002726 | A1 | 5/2012 |

(Continued)

OTHER PUBLICATIONS

JP-2015166386-A, machince translation.*

(Continued)

*Primary Examiner* — Johann R Richter
*Assistant Examiner* — Courtney A Brown
(74) *Attorney, Agent, or Firm* — Panitch Schwarze Belisario & Nadel LLP

(57) ABSTRACT

A composition is provided for controlling pests containing a carboxamide compound represented by the following formula (I):

(I)

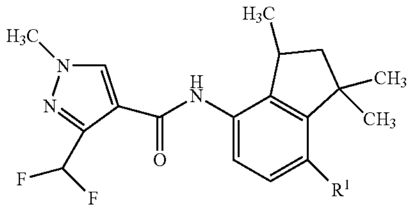

wherein $R^1$ represents a hydrogen atom or a fluorine atom, and one or more compounds selected from the following group (A), wherein the group (A) is a group consisting of a compound represented by the following formula (II):

(II)

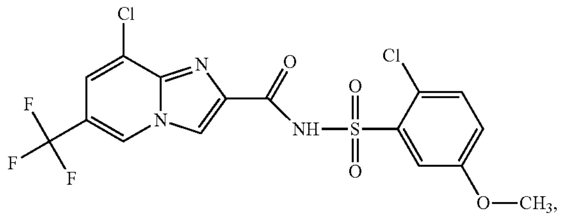

and a compound represented by the following formula (III):

(III)

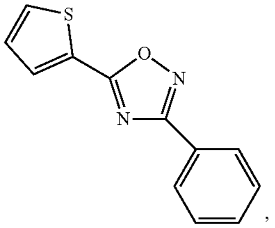

which has an excellent efficacy for controlling pests.

7 Claims, No Drawings

(56) References Cited

U.S. PATENT DOCUMENTS

| | | | |
|---|---|---|---|
| 2014/0221203 | A1 | 8/2014 | Lahm et al. |
| 2015/0164076 | A1 | 6/2015 | Pellacini et al. |
| 2015/0296784 | A1 | 10/2015 | Sawada et al. |
| 2016/0000081 | A1 | 1/2016 | Shimizu et al. |
| 2016/0235064 | A1 | 8/2016 | Swart et al. |

FOREIGN PATENT DOCUMENTS

| | | | | |
|---|---|---|---|---|
| CL | 2012003646 | A1 | | 9/2013 |
| CL | 2013001761 | A1 | | 7/2014 |
| CN | 102858174 | A | | 1/2013 |
| CN | 104602523 | A | | 5/2015 |
| EP | 0199822 | A1 | | 11/1986 |
| JP | 2010536774 | A | | 12/2010 |
| JP | 2012025735 | A | | 2/2012 |
| JP | 2012526125 | A | | 10/2012 |
| JP | 2014501743 | A | | 1/2014 |
| JP | 2015166386 | A | * | 9/2015 |
| JP | 2015166386 | A | | 9/2015 |
| WO | 8602641 | A1 | | 5/1986 |
| WO | 9212970 | A1 | | 8/1992 |
| WO | 2009023721 | A1 | | 2/2009 |
| WO | 2010129500 | A2 | | 11/2010 |
| WO | 2011162397 | A1 | | 12/2011 |
| WO | 2012084812 | A1 | | 6/2012 |
| WO | 2015144480 | A1 | | 10/2015 |
| WO | 2015157005 | A1 | | 10/2015 |
| WO | 2016002594 | A1 | | 1/2016 |

OTHER PUBLICATIONS

International Preliminary Report on Patentability dated Aug. 7, 2018 in International Application No. PCT/JP2017/002672.

International Search Report dated Mar. 14, 2017 in International Application No. PCT/JP2017/002672.

Office Action dated Feb. 11, 2020 in CO Application No. NC20190013761.

Office Action dated Feb. 11, 2020 in CO Application No. NC20190013762.

Office Action dated Feb. 11, 2020 in CO Application No. NC20190013763.

Office Action dated Feb. 28, 2020 in IN Application No. 201847032089.

Office Action dated Mar. 13, 2020 in CN Application No. 201780008006.6.

Office Action dated Mar. 25, 2021 in UA Application No. a201809004.

Office Action dated Aug. 5, 2020 in EP Application No. 17747295.8.

Office Action dated Sep. 30, 2020 in AU Application No. 2017213900.

Office Action dated Jul. 23, 2020 in AR Application No. P170100233 (with Partial English Translation).

Examination and Search Report issued in Colombian Patent Application No. NC2018/0007668 dated Jul. 25, 2019. (with English machine translation).

Supplementary European Search Report dated Sep. 9, 2019 in European Patent Application No. 17747295.8.

Office Action dated Mar. 13, 2020 in ID Application No. P00201806519.

Office Action dated Nov. 18, 2019 in CL Application No. 2018001985.

Office Action dated May 17, 2019 in CL Application No. 201801985.

Partial Supplementary European Search Report dated Jun. 3, 2019 in EP Application No. 17747295.8.

Office Action dated Sep. 10, 2020 in CN Application No. 201780008006.5.

Office Action dated Sep. 15, 2020 in JP Application No. 2017565508 (with English Machine Translation).

Office Action dated Dec. 15, 2020 in AR Application No. P170100233 (with Partial English Translation).

* cited by examiner

PEST CONTROL COMPOSITION AND PEST CONTROL METHOD

CROSS-REFERENCE TO RELATED APPLICATION

This application is a Section 371 of International Application No. PCT/JP2017/002672, filed Jan. 26, 2017, which was published in the Japanese language on Aug. 10, 2017, under International Publication No. WO 2017/135137 A1, which claims priority under 35 U.S.C. § 119(b) to Japanese Application No. 2016-016909, filed Feb. 1, 2016, the disclosures of which are incorporated herein by reference in their entirety.

TECHNICAL FIELD

The present invention relates to a composition for controlling pests and a method for controlling pests.

BACKGROUND ART

In the related art, many compounds have been developed for controlling pests, and put into practical use (for example, refer to Patent Documents 1 and 2).

RELATED ART DOCUMENT

Patent Document

[Patent Document 1] WO 86/02641
[Patent Document 2] WO 92/12970

SUMMARY OF THE INVENTION

Problems to be Solved by Invention

An object of the present invention is to provide a composition having excellent controlling efficacy against pests.

Means to Solve Problems

The present inventor has studied to find a composition having an excellent controlling efficacy against pests, and as a result, has found that a composition for controlling pests comprising a carboxamide compound represented by the following formula (I) and one or more compounds selected from the following group (A) has an excellent controlling efficacy against pests.

That is, the present invention is as follows.

[1] A composition for controlling pests comprising a carboxamide compound represented by the following formula (I):

(I)

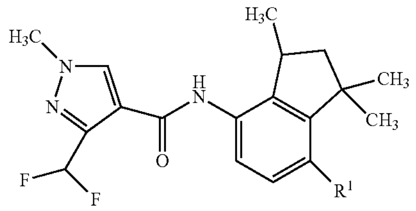

wherein $R^1$ represents a hydrogen atom or a fluorine atom, and one or more compounds selected from the following group (A), Group (A): a group consisting of a compound represented by the following formula (II):

(II)

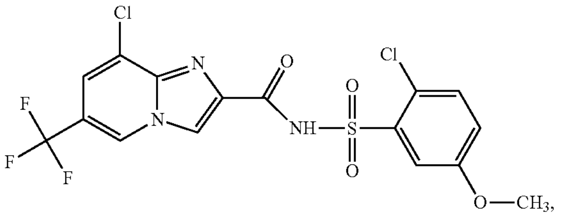

and a compound represented by the following formula (III):

(III)

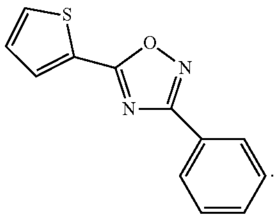

[2] The composition for controlling pests according to [1], wherein the weight ratio of the carboxamide compound represented by the formula (I) to one or more compounds selected from the group (A) is 0.01/1 to 100/1 of carboxamide compound/one or more compounds selected from the group (A).

[3] The composition for controlling pests according to [1] or [2], wherein one or more compounds selected from the group (A) is the compound represented by the formula (II).

[4] The composition for controlling pests according to [1] or [2], wherein one or more compounds selected from the group (A) is the compound represented by the formula (III).

[5]) A method for controlling pests comprising a step of applying an effective amount of a carboxamide compound represented by the following formula (I):

(I)

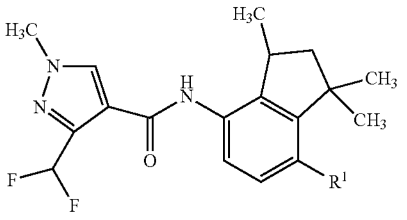

wherein $R^1$ represents a hydrogen atom or a fluorine atom, and one or more compounds selected from the following group (A) to a plant or soil for cultivating a plant, Group (A): a group consisting of a compound represented by the following Formula (II):

(II)

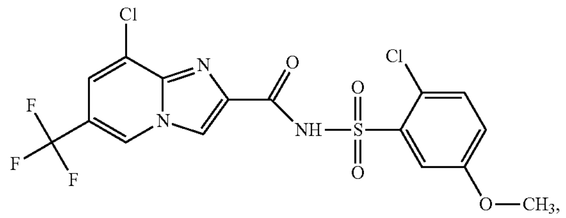

and a compound represented by the following Formula (III):

(III)

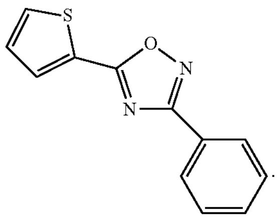

[6] The method for controlling pests according to [5], wherein the weight ratio of the carboxamide compound represented by Formula (I) to one or more compounds selected from the group (A) is 0.01/1 to 100/1 of carboxamide compound/one or more compounds selected from the group (A).

[7] The method for controlling pests according to [5] or [6], wherein one or more compounds selected from the group (A) is the compound represented by the formula (II).

[8] The method for controlling pests according to [5] or [6], wherein one or more compounds selected from the group (A) is the compound represented by the formula (III).

[9] The method for controlling pests according to any one of [5] to [8], wherein a plant or soil for cultivating a plant is soybean or soil for cultivating soybean.

Effect of the Invention

According to the invention, it is possible to control pests.

BEST MODE FOR CARRYING OUT THE INVENTION

The composition for controlling pests of the present invention (hereinafter, referred to as the composition of the present invention) comprises the carboxamide compound represented by the above formula (I) (hereinafter, referred to as the carboxamide compound) and one or more compounds selected from the group (A) (hereinafter, referred to as the compound A).

The carboxamide compound is a compound described in WO 86/02641, WO 92/12970, WO 2011/162397, and WO 2012/084812, and can be produced by the methods described in these documents.

The carboxamide compound is a carboxamide compound represented by the following formula (Ia):

(Ia)

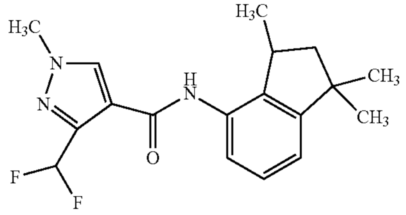

(hereinafter, referred to as the carboxamide compound (Ia)) or a carboxamide compound represented by the following formula (Ib)

(Ib)

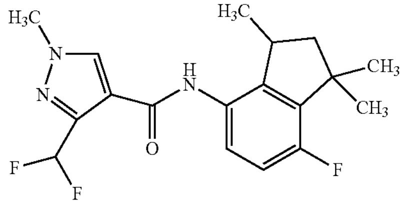

(hereinafter, referred to as the carboxamide compound (Ib)).

In the carboxamide compound (Ia), an enantiomer of the R form represented by the following formula (Ia-R):

(Ia-R)

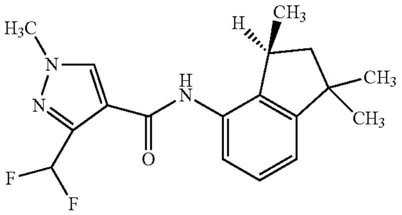

(hereinafter, referred to as the carboxamide compound (Ia-R)) and an enantiomer of the S form represented by the following formula (Ia-S):

(Ia-S)

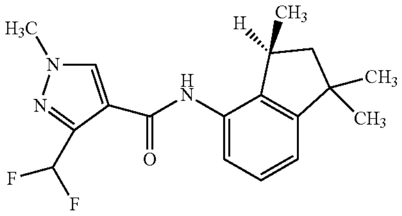

(hereinafter, referred to as the carboxamide compound (Ia-S)) are present.

The carboxamide compound (Ia) is a mixture including these enantiomers in an arbitrary ratio, the carboxamide compound (Ia-R), or the carboxamide compound (Ia-S). In a case where the carboxamide compound (Ia) is a mixture of the carboxamide compound (Ia-R) and the carboxamide compound (Ia-S), the enantiomer ratio of the carboxamide compound (Ia) is preferably 50/50 or greater, and more preferably 80/20 to 99.999/0.001 (carboxamide compound (Ia-R)/carboxamide compound (Ia-S)).

The compound represented by the formula (II) (hereinafter, referred to as the compound (II)) is described in WO 2010/129500, and is known as the generic name of fluazaindolizine. The compound (II) can be produced by a known method.

The compound represented by the formula (III) (hereinafter, referred to as the compound (III)) is described in WO 2006/114400, and is known as the generic name of tioxazafen. The compound (III) can be produced by a known method.

The weight ratio of the carboxamide compound to the compound A in the composition of the present invention is usually 0.01/1 to 500/1, and preferably 0.01/1 to 100/1 or 0.05/1 to 100/1 of carboxamide compound/compound A.

The composition of the present invention may be a mixture itself of the carboxamide compound and the compound A, and in general, the composition of the present invention is formulated into oil, an emulsifiable concentrate, a Plowable agent, a wettable powder, a granulated wettable powder, a powder agent, and granule by mixing the carboxamide compound, the compound A, and an inert carrier, and adding a surfactant or other adjuvants for formulation as necessary. The formulation can be used as a formulation for controlling pests, alone or by adding other inert ingredients.

In the composition of the present invention, the carboxamide compound and the compound A are usually contained by 0.1% to 99% by weight, preferably 0.2% to 90% by weight, and more preferably 1% to 80% by weight in total.

As the inert carrier used for formulation, a solid carrier and a liquid carrier can be exemplified, and examples of the solid carrier include fine powdery or granular materials formed of minerals such as kaolin clay, attapulgite clay, bentonite, montmorillonite, acid clay, pyrophyllite, talc, diatomaceous earth, and calcite, natural organic substances such as corncob powder and walnut powder, synthetic organic substances such as urea, salts such as calcium carbonate and ammonium sulfate, or synthetic inorganic substances such as synthetic hydrated silicon oxide, and examples of the liquid carrier include aromatic hydrocarbons such as xylene, alkylbenzene, and methylnaphthalene, alcohols such as 2-propanol, ethylene glycol, propylene glycol, and ethylene glycol monoethyl ether, ketones such as acetone, cyclohexanone, and isophorone, plant oil such as soybean oil and cotton seed oil, petroleum-based aliphatic hydrocarbons, esters, dimethylsulfoxide, acetonitrile, and water.

Examples of the surfactants include anionic surfactants such as an alkyl sulfuric acid ester salt, an alkyl aryl sulfonic acid salt, a dialkyl sulfosuccinic acid salt, a polyoxyethylene alkyl aryl ether phosphoric acid ester salt, a lignin sulfonic acid salt, and a naphthalene sulfonate formaldehyde polycondensate, nonionic surfactants such as a polyoxyethylene alkyl aryl ether, a polyoxyethylene alkyl polyoxypropylene block copolymer, and a sorbitan fatty acid ester, and cationic surfactants such as an alkyl trimethyl ammonium salt.

Examples of other adjuvants for formulation include water-soluble polymers such as polyvinyl alcohol and polyvinyl pyrrolidone, gum Arabic, alginic acid and a salt thereof, polysaccharides such as CMC (carboxymethylcellulose) and xanthan gum, inorganic substances such as aluminum magnesium silicate and alumina sol, preservatives, colorants, and stabilizing agents such as PAP (isopropyl acid phosphate) and BHT.

The composition of the present invention can be prepared by mixing each formulation obtained by formulating each of the carboxamide compound and the compound A by the above-described method or can also be prepared by mixing each mixed solution obtained by mixing each of these formulations with water.

The composition of the present invention may be used to protect plants from harm caused by pests. In the present specification, harmful insects and plant diseases which cause harm such as eating, sucking, etc. to plants are collectively called pests.

Examples of the harmful insects on which the composition of the present invention has controlling efficacy include the following.

Hemiptera pests: planthoppers such as small brown planthoppers (*Laodelphax striatellus*), brown planthoppers (*Nilaparvata lugens*), and white-backed planthoppers (*Sogatella furcifera*); leafhoppers such as green rice leafhoppers (*Nephotettix cincticeps*) and Taiwan green rice leafhoppers (*Nephotettix virescens*); aphids such as cotton aphids (*Aphis gossypii*), green peach aphids (*Myzus persicae*), cabbage aphids (*Brevicoryne brassicae*), potato aphids (*Macrosiphum euphorbiae*), greenhouse potato aphids (*Aulacorthum solani*), bird-cherry oat aphids (*Rhopalosiphum padi*), and black citrus aphids (*Toxoptera citricidus*); stink bugs such as eastern green stink bugs (*Nezara antennata*), bean bugs (*Riptortus clavetus*), male rice bugs (*Leptocorisa chinensis*), white-spotted spined bugs (*Eysarcoris parvus*), brown marmorated stink bugs (*Halyomorpha mista*), and turnished plant bugs (*Lygus lineolaris*); whiteflies such as greenhouse whiteflies (*Trialeurodes vaporariorum*) and silverleaf whiteflies (*Bemisia argentifolii*); scale insects such as red scales (*Aonidiella aurantii*), San Jose scales (*Comstockaspis perniciosa*), citrus snow scales (*Unaspis citri*), red wax scales (*Ceroplastes rubens*), and cottony cushion scales (*Icerya purchasi*); lace bugs; and psyllids;

Lepidoptera pests: pyralids such as asiatic rice borers (*Chilo suppressalis*), yellow stem borers (*Tryporyza incertulas*), rice leafrollers (*Cnaphalocrocis medinalis*), cotton leaf rollers (*Notarcha derogata*), Indian meal moths (*Plodia interpunctella*), Asian corn borers (*Ostrinia furnacalis*), cabbage webworms (*Hellula undalis*), and bluegrass webworms (*Pediasia teterrellus*); noctuids such as oriental leafworm moths (*Spodoptera litura*), beet armyworms (*Spodoptera exigua*), oriental armyworms (*Pseudaletia separata*), cabbage moths (*Mamestra brassicae*), black cutworms (*Agrotis ipsilon*), asiatic common loopers (*Plusia nigrisigna*), *Trichoplusia* spp., *Heliothis* spp., and *Helicoverpa* spp.; pieridae such as small white butterflies (*Pieris rapae*); leaf roller moths such as *Adoxophyes* spp., oriental fruit moths (*Grapholita molesta*), soybean pod borers (*Leguminivora glycinivorella*), adzuki bean podworms (*Matsumuraeses azukivora*), summer fruit tortrix moths (*Adoxophyes orana fasciata*), smaller tea tortrixes (*Adoxophyes* sp.), oriental tea tortrix moths (*Homona magnanima*), apple tortrixes (*Archips fuscocupreanus*), and codling moths (*Cydia pomonella*); meaf miners such as tea leaf rollers (*Caloptilia theivora*), and apple leaf miner (*Phyllonorycter ringoneella*); codling moths such as peach fruit moths (*Carposina niponensis*); leafminer moths such as *Rionetia* spp.; tussock moths such as *Lymantria* spp. and *Euproctis* spp.; ermine moths such as diamondback moths (*Plutella xylostella*); pink bollworms (*Pectinophora gossypiella*) and potato tuber moths (*Phthorimaea operculella*); tiger moths such as fall webworms (*Hyphantria cunea*); and tineids such as clothes moths (*Tinea translucens*) and common clothes moths (*Tineola bisselliella*);

Thysanoptera pests: trips such as western flower thrips (*Frankliniella occidentalis*), southern yellow thrips (*Thrips parmi*), yellow tea thrips (*Scirtothrips dorsalis*), onion thrips (*Thrips tabaci*), flower thrips (*Fankliniella intonsa*), and tobacco thrips (*Frankliniella fusca*);

Diptera pests: houseflies (*Musca domestica*), house mosquito (*Culex pipiens pallens*), gadflies (*Tabanus trigonus*), onion flies (*Hylemya antiqua*), bean seed flies (*Hylemya platura*), hyrcanus group mosquitoes (*Anopheles sinensis*), Japanese rice leafminers (*Agromyza oryzae*), rice leafminers (*Hydrellia griseola*), rice stem maggots (*Chlorops oryzae*), melon flies (*Dacus cucurbitae*), Mediterranean fruit flies (*Ceratitis capitata*), and American serpentine leafminers (*Liriomyza trifolii*);

Coleoptera pests: 28-spotted ladybirds (*Epilachna vigintioctopunctata*), cucurbit leaf beetles (*Aulacophora femoralis*), striped flea beetles (*Phyllotreta striolata*), rice leaf beetles (*Oulema oryzae*), rice plant weevils (*Echinocnemus squameus*), rice water weevils (*Lissorhoptrus oryzophilus*), boll weevils (*Anthonomus grandis*), adzuki bean weevils (*Callosobruchus chinensis*), hunting billbugs (*Sphenophorus venatus*) Japanese beetles (*Popillia japonica*), scarab beetles (*Anomala cuprea*), a group of western corn rootworms (*Diabrotica* spp.), Colorado potato beetles (*Leptinotarsa decemlineata*), a group of click beetles (*Agriotes* spp.), cigarette beetles (*Lasioderma serricorne*), varied carpet beetles (*Anthrenus verbasci*), red flour beetles (*Tribolium castaneum*), powderpost beetles (*Lyctus brunneus*), sitrus long-horned beetles (*Anoplophora malasiaca*), and common pine shoot beetles (*Tomicus piniperda*);

Orthopteran pests: migratory locusts (*Locusta migratoria*), mole crickets (*Gryllotalpa africana*), rice grasshoppers (*Oxya yezoensis*), and rice grasshoppers (*Oxya japonica*);

Hymenoptera pests: turnip sawflies (*Athalia rosae*), leafcutter ants (*Acromyrmex* spp.), and fire ants (*Solenopsis* spp.); and Blattodea Pests: German cockroaches (*Blattella germanica*), smoky brown cockroaches (*Periplaneta fuliginosa*), American cockroaches (*Periplaneta americana*), brown cockroaches (*Periplaneta brunnea*), and oriental cockroaches (*Blatta orientalis*).

Examples of the plant diseases on which the composition of the present invention has controlling efficacy include the following.

Rice diseases: blast (*Magnaporthe grisea*), brown spot (*Cochliobolus miyabeanus*), sheath blight (*Rhizoctonia solani*), and bakanae (*Gibberella fujikuroi*).

Wheat diseases: powdery mildew (*Erysiphe graminis*), fusarium head blight (*Fusarium graminearum, F. avenacerum, F. culmorum, Microdochium nivale*), rust (*Puccinia striiformis, P. graminis, P. recondita*), pink snow rot (*Micronectriella nivale*), Typhula snow blight (*Typhula* sp.), loose smut (*Ustilago tritici*), smut (*Tilletia caries*), Eyespot (*Pseudocercosporella herpotrichoides*), leaf blight (*Mycosphaerella graminicola*), septoria leaf spot (*Stagonospora nodorum*), and tan spot (*Pyrenophora tritici-repentis*).

Barley diseases: powdery mildew (*Erysiphe graminis*), Fusarium head blight (*Fusarium graminearum, F. avenacerum, F. culmorum, Microdochium nivale*), rust (*Puccinia striiformis, P. graminis, P. hordei*), loose smut (*Ustilago nuda*), leaf blotch (*Rhynchosporium secalis*), net blotch (*Pyrenophora teres*), leaf spot (*Cochliobolus sativus*), leaf stripe (*Pyrenophora graminea*), and Rhizoctonia damping-off (*Rhizoctonia solani*).

Corn diseases: smut (*Ustilago maydis*), brown leaf spot (*Cochliobolus heterostrophus*), copper spot (*Gloeocercospora sorghi*), southern rust (*Puccinia polysora*), gray leaf spot (*Cercospora zeae-maydis*), and Rhizoctonia damping-off (*Rhizoctonia solani*).

Citrus diseases: melanose (*Diaporthe citri*), scab (*Elsinoe fawcetti*), green mold (*Penicillium digitatum, P. italicum*), and brown rot (*Phytophthora parasitica, Phytophthora citrophthora*).

Apple diseases: blossom blight (*Monilinia mali*), canker (*Valsa ceratosperma*), powdery mildew (*Podosphaera leucotricha*), Alternaria leaf spot (*Alternaria alternata apple pathotype*), scab (*Venturia inaequalis*), bitter rot (*Colletotrichum acutatum*), and crawn rot (*Phytophtora cactorum*).

Pear diseases: scab (*Venturia nashicola, V. pirina*), black spot (*Alternaria alternata* Japanese pear pathotype), rust (*Gymnosporangium haraeanum*), and phytophthora fruit rot (*Phytophtora cactorum*);

Peach diseases: brown rot (*Monilinia fructicola*), scab (*Cladosporium carpophilum*), and Phomopsis rot (*Phomopsis* sp.).

Grapes diseases: anthracnose (*Elsinoe ampelina*), ripe rot (*Glomerella cingulata*), powdery mildew (*Uncinula necator*), rust (*Phakopsora ampelopsidis*), black rot (*Guignardia bidwellii*), and downy mildew (*Plasmopara viticola*).

Japanese persimmon diseases: anthracnose (*Gloeosporium kaki*) and leaf spot (*Cercospora kaki, Mycosphaerella nawae*).

Gourd family diseases: anthracnose (*Colletotrichum lagenarium*), powdery mildew (*Sphaerotheca fuliginea*), gummy stem blight (*Mycosphaerella melonis*), Fusarium wilt (*Fusarium oxysporum*), downy mildew (*Pseudoperonospora cubensis*), Phytophthora rot (*Phytophthora* sp.), and damping-off (*Pythium* sp.);

Tomato diseases: early blight (*Alternaria solani*), leaf mold (*Cladosporium fulvum*), and late blight (*Phytophthora infestans*).

Egg plant diseases: brown spot (*Phomopsis vexans*) and powdery mildew (*Erysiphe cichoracearum*).

Cruciferous vegetable diseases: Alternaria leaf spot (*Alternaria japonica*), white spot (*Cercosporella brassicae*), clubroot (*Plasmodiophora brassicae*), and downy mildew (*Peronospora parasitica*).

Welsh onion diseases: rust (*Puccinia allii*) and downy mildew (*Peronospora destructor*).

Soybean diseases: purple seed stain (*Cercospora kikuchii*), sphaceloma scad (*Elsinoe glycines*), pod and stem blight (*Diaporthe phaseolorum* var. sojae), septoria brown spot (*Septoria glycines*), frogeye leaf spot (*Cercospora sojina*), rust (*Phakopsora pachyrhizi*), brown stem rot (*Phytophthora sojae*), Rhizoctonia damping-off (*Rhizoctonia solani*), brown ring spot (*Corynespora casiicola*), and sclerotinia rot (*Sclerotinia sclerotiorum*).

Kidney bean disease: anthracnose (*Colletotrichum lindemthianum*).

Peanut diseases: leaf spot (*Cercospora personata*), brown leaf spot (*Cercospora arachidicola*), and southern blight (*Sclerotium rolfsii*).

Garden pea diseases: powdery mildew (*Erysiphe pisi*).

Potato diseases: early blight (*Alternaria solani*), late blight (*Phytophthora infestans*), pink rot (*Phytophthora erythroseptica*), and powdery scab (*Spongospora subterranean f.* sp. subterranea).

Strawberry diseases: powdery mildew (*Sphaerotheca humuli*) and anthracnose (*Glomerella cingulata*).

Tea diseases: net blister blight (*Exobasidium reticulatum*), white scab (*Elsinoe leucospila*), gray blight (*Pestalotiopsis* sp.), and anthracnose (*Colletotrichum theae-sinensis*).

Tobacco diseases: brown spot (*Alternaria longipes*), powdery mildew (*Erysiphe cichoracearum*), anthracnose (*Colletotrichum tabacum*), downy mildew (*Peronospora tabacina*), and black shank (*Phytophthora nicotianae*).

Rapeseed diseases: sclerotinia rot (*Sclerotinia sclerotiorum*) and Rhizoctonia damping-off (*Rhizoctonia solani*).

Cotton diseases: Rhizoctonia damping-off (*Rhizoctonia solani*).

Sugar beet diseases: Cercospora leaf spot (*Cercospora beticola*), leaf rot (*Thanatephorus cucumeris*), root rot (*Thanatephorus cucumeris*), and Aphanomyces root rot (*Aphanomyces cochlioides*).

Rose diseases: black spot (*Diplocarpon rosae*), powdery mildew (*Sphaerotheca pannosa*), and downy mildew (*Peronospora sparsa*).

Diseases of chrysanthemum and asteraceous vegetables: downy mildew (*Bremia lactucae*), leaf blight (*Septoria chrysanthemi-indici*), and white rust (*Puccinia horiana*).

Diseases of various groups: diseases caused by *Pythium* spp. (*Pythium aphanidermatum, Pythium debarianum, Pythium graminicola, Pythium irregulars, Pythium ultimum*), gray mold (*Botrytis cinerea*), and Sclerotinia rot (*Sclerotinia sclerotiorum*).

Radish disease: Alternaria leaf spot (*Alternaria brassicicola*).

Turfgrass diseases: dollar spot (*Sclerotinia homeocarpa*), and brown patch and large patch (*Rhizoctonia solani*).

Banana disease: sigatoka (*Mycosphaerella fijiensis, Mycosphaerella musicola*).

Sunflower disease: downy mildew (*Plasmopara halstedii*).

Seed diseases or diseases in the early stages of the growth of various plants caused by *Aspergillus* spp., *Penicillium* spp., *Fusarium* spp., *Gibberella* spp., *Tricoderma* spp., *Thielaviopsis* spp., *Rhizopus* spp., gMucor spp., *Corticium* spp., *Phoma* spp., *Rhizoctonia* spp., and *Diplodia* spp.

Viral diseases of various plants mediated by *Polymixa* spp. or *Olpidium* spp.

The composition of the present invention can be used for the following plants.

Crops: corn, rice, wheat, barley, rye, oat, sorghum, cotton, soybean, peanut, buckwheat, sugar beet, rapeseed, sunflower, sugar cane, tobacco, etc., Vegetables: solanaceous vegetables (eggplant, tomato, bell pepper, pepper, potato, etc.), cucurbitaceous vegetables (cucumber, pumpkin, zucchini, watermelon, melon, squash, etc.), cruciferous vegetables (Japanese radish, turnip, horseradish, kohlrabi, Chinese cabbage, cabbage, leaf mustard, broccoli, cauliflower, etc.), asteraceous vegetables (burdock, crown daisy, artichoke, lettuce, etc.) liliaceous vegetables (green onion, onion, garlic, and asparagus), Umbelliferous vegetables (carrot, parsley, celery, parsnip, etc.), chenopodiaceous vegetables (spinach, Swiss chard, etc.), lamiaceous vegetables (Perilla frutescens, mint, basil, etc.), strawberry, sweet potato, Dioscorea japonica, colocasia, etc., Flowers, Foliage plants, Turf grasses, Fruits: pome fruits (apple, pear, Japanese pear, Chinese quince, quince, etc.), stone fruits (peach, plum, nectarine, Japanese apricot (*Prunus mume*), cherry fruit, apricot, prune, etc.), citrus fruits (*Citrus unshiu*, orange, lemon, rime, grapefruit, etc.), nuts (chestnuts, walnuts, hazelnuts, almond, pistachio, cashew nuts, macadamia nuts, etc.), berries (blueberry, cranberry, blackberry, raspberry, etc.), grape, kaki fruit, olive, Japanese plum, banana, coffee, date palm, coconuts, etc., and Trees other than fruit trees; tea, mulberry, flowering plant, roadside trees (ash, birch, dogwood, Eucalyptus, ginkgo (*Ginkgo biloba*), lilac, maple, oak (*Quercus*), poplar, Cercis chinensis, Formosan gum (*Liquidambar formosana*), plane tree, zelkova, Japanese arborvitae, fir wood, hemlock, juniper, Pinus, Picea, and yew (*Taxus cuspidate*), etc.

The plants described above may be plants to which resistance is applied by gene recombination techniques.

Among the above, in particular, high controlling effect on plant diseases occurring in soybeans is expected.

In addition, as plant diseases occurring in soybeans, against which particularly high efficacy is expected, Rhizoctonia damping-off (*Rhizoctonia solani*), purple seed stain (*Cercospora kikuchii*), septoria brown spot (*Septoria glycines*), brown ring spot (*Corynespora casilcola*), rust (*Phakopsora pachyrizi*), sclerotinia rot (*Sclerotinia sclerotiorum*), and frogeye leaf spot (*Cercospora sojina*) are exemplified.

Examples of an aspect of the composition of the present invention include the following.

A composition comprising the carboxamide compound (Ia-R) and the compound (II);

A composition comprising the carboxamide compound (Ia-R) and the compound (III);

A composition comprising the carboxamide compound (Ib) and the compound (II);

A composition comprising the carboxamide compound (Ib) and the compound (III);

A composition comprising the carboxamide compound (Ia-R) and the compound (II) in which the weight ratio of carboxamide compound (Ia-R) to compound (II) is 0.01/1 to 100/1;

A composition comprising the carboxamide compound (Ia-R) and the compound (III) in which the weight ratio of carboxamide compound (Ia-R) to compound (III) is 0.01/1 to 100/1;

A composition comprising the carboxamide compound (Ib) and the compound (II) in which the weight ratio of carboxamide compound (Ib) to compound (II) is 0.05/1 to 100/1; and A composition comprising the carboxamide compound (Ib) and the compound (III) in which the weight ratio of carboxamide compound (Ib) to compound (III) is 0.05/1 to 100/1.

The method for controlling pests of the present invention (hereinafter, described as the control method of the present invention) includes a step of applying an effective amount of the carboxamide compound and the compound A to a plant or soil for cultivating a plant. In plants to be applied, foliage of a plant, seeds of a plant, and bulbs of a plant are included. Here, the bulbs mean discoid stems, corms, rhizomes, tubers, tuberous roots, and rhizophores.

In the control method of the present invention, the carboxamide compound and the compound A can be separately applied to a plant or soil for cultivating a plant in the same period, but the composition of the present invention is usually applied in an effective amount from the viewpoint of simplicity of application.

In the control method of the present invention, examples of the method of applying the carboxamide compound and the compound A include a foliar treatment, a soil treatment, a root treatment, and a seed treatment.

Examples of the foliar treatment include a method of applying the carboxamide compound and the compound A to the surface of a plant which is being cultivated, by spraying to foliage or a trunk.

Examples of the root treatment include a method of immersing a whole plant or a root part of a plant into a solution comprising the carboxamide compound and the compound A and a method of attaching a solid formulation comprising the carboxamide compound, the compound A, and a solid carrier to roots of a plant.

Examples of the soil treatment include spraying onto the soil, admixing with the soil, and irrigating a solution into the soil.

Examples of the seed treatment include a treatment of seeds or bulbs of a plant to be protected from harm caused by pests with the composition of the present invention, and specifically, examples thereof include a spraying treatment in which a suspension of the composition of the present invention is sprayed onto a seed surface or a bulb surface in the form of mist, a smearing treatment in which the composition of the present invention in the form of wettable powder, emulsifiable concentrate, or a flowable agent, and as necessary, added with water is applied to seeds or bulbs, an immersing treatment in which seeds are immersed in a mixed solution of the composition of the present invention and water for a certain period of time, a film coating treatment, a pellet coating treatment, etc.

In the control method of the present invention, the total amount of the carboxamide compound and the compound A applied can be changed depending on the kind of plant to be applied, the kind and the frequency of occurrence of pests to be controlled, a formulation form, an application period, an application method, an application place, a climatic condition, etc., and in a case where the carboxamide compound and the compound A are applied to foliage of a plant or soil for cultivating a plant, the total amount applied is usually 1 to 500 g, preferably 2 to 200 g, and more preferably 10 to 100 g per 1000 $m^2$. In the case of a seed treatment, the total amount of the carboxamide compound and the compound A applied is usually 0.001 to 10 g, and preferably 0.01 to 1 g per 1 kg of seeds. The seed treatment is performed on unseeded seeds. The unseeded seeds mean seeds at an arbitrary point in time until seeded.

In a case where the formulation form is emulsion, wettable powder, or a flowable agent, the formulation is typically applied by spraying a liquid chemical obtained by mixing the formulation with water. The concentration of the carboxamide compound and the compound A in the liquid chemical is usually 0.0005% to 2% by weight, and preferably 0.005% to 1% by weight in terms of the total concentration of these compounds. In a case where the formulation form is a powder agent or granule, the formulation is usually applied as it is without being diluted.

EXAMPLES

Hereinafter, formulation examples and test examples of the present invention will be described in more detail, and the present invention is not limited to the following examples. In the following examples, "part(s)" represents "part(s) by weight" unless otherwise specified.

Formulation Example 1

2 parts of any one of the carboxamide compound (Ia) and the carboxamide compound (Ib), 8 parts of the compound (II), 35 parts of a mixture (weight ratio of 1:1) of white carbon and a polyoxyethylene alkyl ether sulfate ammonium salt, and 55 parts of water were mixed, and the mixture was milled by a wet milling method, whereby each flowable formulation was obtained.

Formulation Example 2

5 parts of any one of the carboxamide compound (Ia) and the carboxamide compound (Ib), 10 parts of the compound (II), 1.5 parts of sorbitan trioleate, and 28.5 parts of a polyvinyl alcohol aqueous solution obtained by mixing 2 parts of polyvinyl alcohol and 26.5 parts of water were mixed, and the mixture was milled by a wet milling method, whereby suspension was obtained. 45 parts of a mixed solution obtained by mixing 0.05 parts of xanthan gum, 0.1 parts of aluminum magnesium silicate, and 44.85 parts of water was added to the suspension, then, 10 parts of propylene glycol was further added thereto, and the resulting product was mixed by stirring, whereby each flowable formulation was obtained.

Formulation Example 3

1 part of any one of the carboxamide compound (Ia) and the carboxamide compound (Ib), 4 parts of the compound (II), 1 part of synthetic hydrated silicon oxide, 2 parts of calcium lignin sulfonate, 30 parts of bentonite, and 62 parts of kaolin clay were fully milled and mixed, water was added thereto, the resulting product was fully kneaded, and granulation drying was performed, whereby each granule was obtained.

Formulation Example 4

12.5 parts of any one of the carboxamide compound (Ia) and the carboxamide compound (Ib), 37.5 parts of the compound (II), 3 parts of calcium lignin sulfonate, 2 parts of sodium lauryl sulfate, and 45 parts of synthetic hydrated silicon oxide were fully ground and mixed, whereby each wettable powder was obtained.

Formulation Example 5

3 parts of any one of the carboxamide compound (Ia) and the carboxamide compound (Ib), 2 parts of the compound (II), 85 parts of kaolin clay, and 10 parts of talc were fully ground and mixed, whereby each powder agent was obtained.

Formulation Example 6

The same operation as in Formulation Example 1 was performed except that the compound (III) was used instead of the compound (II), whereby each flowable formulation was obtained.

Formulation Example 7

The same operation as in Formulation Example 2 was performed except that the compound (III) was used instead of the compound (II), whereby each flowable formulation was obtained.

Formulation Example 8

The same operation as in Formulation Example 3 was performed except that the compound (III) was used instead of the compound (II), whereby each granule was obtained.

Formulation Example 9

The same operation as in Formulation Example 4 was performed except that the compound (III) was used instead of the compound (II), whereby each wettable powder was obtained.

Formulation Example 10

The same operation as in Formulation Example 5 was performed except that the compound (III) was used instead of the compound (II), whereby each powder agent was obtained.

Hereinafter, test examples are shown.

Test Example 1

A cyclohexanone solution of the compound was prepared such that the treatment amount of the compound when seeds were treated therewith became the value described in Tables 1 and 2. 10 g of seeds of soybean (Hatayutaka) and 100 μl of the cyclohexanone solution were put into a plastic container, then, the plastic container was covered with a lid and shaken, and the seeds taken out from the container were left overnight, whereby treated seeds were obtained.

One day after the above-described treatment, soil contaminated with *Rhizoctonia solani* was packed in a plastic pot, and the treated seeds were seeded and cultivated for 12 days in a glass greenhouse (this was used as a treated area). Thereafter, the presence or absence of incidence of Rhizoctonia damping-off (*Rhizoctonia solani*) in seedlings budded from seeds was observed, and the incidence of disease was calculated by the following equation (1).

On the other hand, soybean seeds on which the seed treatment had not been performed were cultivated in the same manner as in the treated area (this was used as a non-treated area). Then, the incidence of disease was calculated in the same manner as in the treated area.

From each of the incidences of disease of the treated area and the non-treated area, the efficacy of the treated area was calculated by the following equation (2). The results thereof are shown in Tables 1 and 2. The enantiomer ratio of the carboxamide compound (Ia) in Tables 1 and 2 is 97/3 of carboxamide compound (Ia-R)/carboxamide compound (Ia-S).

Incidence of disease (%)=(number of seedlings budded in which disease occurred/total number of seedlings budded)×100 "Equation (1)"

Efficacy (%)=(1−incidence of disease of treated area/incidence of disease of non-treated area)×100 "Equation (2)"

TABLE 1

| Carboxamide compound (Ia) (g/100 kg seed) | Compound (II) (g/100 kg seed) | Efficacy | Weight ratio (carboxamide compound (Ia)/ compound (II)) |
|---|---|---|---|
| 0.2 | 20 | 76 | 0.01/1 |
| 0.2 | 0.2 | 71 | 1/1 |
| 0.2 | 0.002 | 63 | 100/1 |

TABLE 2

| Carboxamide compound (Ia) (g/100 kg seed) | Compound (III) (g/100 kg seed) | Efficacy | Weight ratio (carboxamide compound (Ia)/ compound (II)) |
|---|---|---|---|
| 0.2 | 20 | 74 | 0.01/1 |
| 0.2 | 0.2 | 66 | 1/1 |
| 0.2 | 0.002 | 68 | 100/1 |

Test Example 2

A cyclohexanone solution of the compound was prepared such that the treatment amount of the compound when seeds were treated therewith became the value described in Tables 3 and 4. 10 g of seeds of soybean (*Hatayutaka*) and 100 μl of the cyclohexanone solution were put into a plastic container, then, the plastic container was covered with a lid and shaken, and the seeds taken out from the container were left overnight, whereby treated seeds were obtained.

One day after the above-described treatment, soil contaminated with *Rhizoctonia solani* was packed in a plastic pot, and the treated seeds were seeded and cultivated for 8 days in a glass greenhouse (this was used as a treated area). Thereafter, the presence or absence of incidence of Rhizoctonia damping-off (*Rhizoctonia solani*) in seedlings budded from seeds was observed, and the incidence of disease was calculated by the above-described equation (1).

On the other hand, soybean seeds on which the seed treatment had not been performed were cultivated in the same manner as in the treated area (this was used as a non-treated area). Then, the incidence of disease was calculated in the same manner as in the treated area.

From each of the incidences of disease of the treated area and the non-treated area, the efficacy of the treated area was calculated by the above-described equation (2). The results thereof are shown in Tables 3 and 4.

TABLE 3

| Carboxamide compound (Ib) (g/100 kg seed) | Compound (II) (g/100 kg seed) | Efficacy | Weight ratio (carboxamide compound (Ib)/ compound (II)) |
|---|---|---|---|
| 1.0 | 20 | 63 | 0.05/1 |
| 1.0 | 1 | 61 | 1/1 |
| 1.0 | 0.01 | 61 | 100/1 |

TABLE 4

| Carboxamide compound (Ib) (g/100 kg seed) | Compound (III) (g/100 kg seed) | Efficacy | Weight ratio (carboxamide compound (Ib)/ compound (III)) |
|---|---|---|---|
| 1.0 | 20 | 61 | 0.05/1 |
| 1.0 | 1 | 58 | 1/1 |
| 1.0 | 0.01 | 61 | 100/1 |

The invention claimed is:

1. A composition for controlling pests comprising a carboxamide compound represented by the following formula (I):

(I)

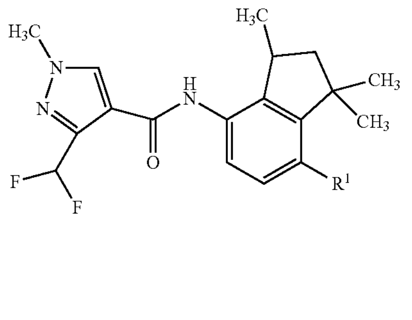

wherein $R^1$ represents a hydrogen atom or a fluorine atom, and one or more compounds selected from the following group (A), wherein the group (A) is a group consisting of a compound represented by the following formula (II):

(II)

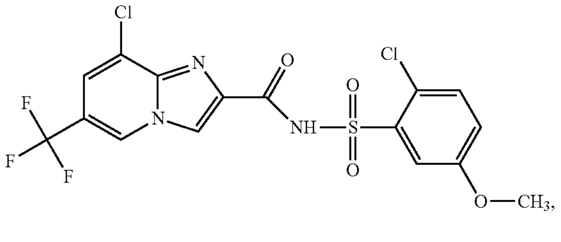

and a compound represented by the following formula (III):

(III)

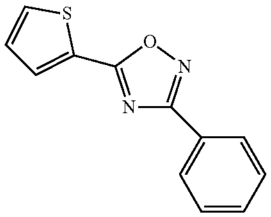

and wherein the weight ratio of the carboxamide compound represented by the formula (I) to one or more compounds selected from the group (A) is 0.01/1 to 100/1.

2. The composition for controlling pests according to claim 1, wherein one or more compounds selected from the group (A) is the compound represented by the formula (II).

3. The composition for controlling pests according to claim 1, wherein one or more compounds selected from the group (A) is the compound represented by the formula (III).

4. A method for controlling pests, comprising applying an effective amount of a carboxamide compound represented by the following formula (I):

(I)

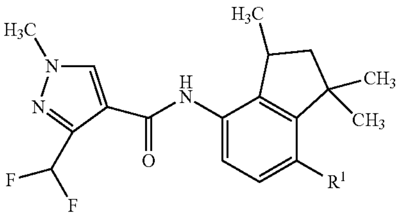

wherein $R^1$ represents a hydrogen atom or a fluorine atom, and one or more compounds selected from the following group (A) to a plant or soil for cultivating a plant, wherein the group (A) is a group consisting of a compound represented by the following formula (II):

(II)

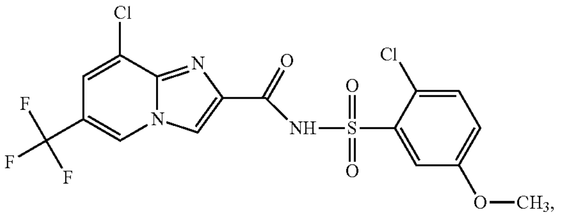

and a compound represented by the following formula (III):

(III)

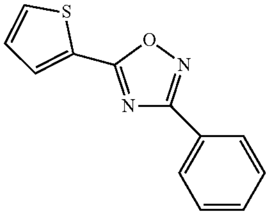

and wherein the weight ratio of the carboxamide compound represented by the formula (I) to one or more compounds selected from the group (A) is 0.01/1 to 100/1.

5. The method for controlling pests according to claim 4, wherein one or more compounds selected from the group (A) is the compound represented by the formula (II).

6. The method for controlling pests according to claim 4, wherein one or more compounds selected from the group (A) is the compound represented by the formula (III).

7. The method for controlling pests according to claim 4, wherein the plant or the soil for cultivating the plant is soybean or soil for cultivating soybean.

* * * * *